United States Patent [19]
duBrucq

[11] Patent Number: 4,458,608
[45] Date of Patent: Jul. 10, 1984

[54] ALL WEATHER JET BURNER FOR PLANTERS

[76] Inventor: William J. duBrucq, 25347 SW. 142nd Ave., Homestead, Fla. 33032

[21] Appl. No.: 252,466

[22] Filed: Apr. 9, 1981

[51] Int. Cl.³ .............................................. A01C 11/00
[52] U.S. Cl. ................................... 111/3; 126/271.1; 126/401; 431/350
[58] Field of Search ............................... 126/401-414, 126/91 A, 271.1; 431/9, 115, 116, 158, 242, 243, 247, 350, 345, 171; 47/9; 111/2, 3; 425/290, DIG. 37; 264/80, 154, 155, 156

[56] References Cited

U.S. PATENT DOCUMENTS

| 724,002 | 3/1903 | Freytag | 126/405 |
|---|---|---|---|
| 731,004 | 6/1903 | Wirsching | 126/407 |
| 748,627 | 1/1904 | Mahony | 126/410 |
| 754,129 | 3/1904 | Dietz | 126/405 |
| 1,350,181 | 8/1920 | Ramané | 126/413 |
| 3,174,474 | 3/1965 | Jones et al. | 126/91 A |
| 3,306,239 | 2/1967 | Martin | 111/3 |
| 3,333,557 | 8/1967 | Kappelmann et al. | 47/9 X |
| 3,688,760 | 9/1972 | Rudin | 126/91 A |
| 3,894,589 | 7/1975 | Ciraud | 111/2 X |
| 4,097,223 | 6/1978 | Garnier | 126/91 A X |
| 4,306,508 | 12/1981 | Skipper | 126/401 X |

Primary Examiner—Larry Jones
Assistant Examiner—Carl D. Price
Attorney, Agent, or Firm—Harvey B. Jacobson

[57] ABSTRACT

A burner for attachment to and forming a part of a planter which places pre-germinated seeds combined with soil and a gel into a seed bed covered by a plastic film of thermoplastic material with the burner serving to form a hole through the plastic film and form a cavity in the seed bed. The burner is in the form of a hollow burner housing provided with peripheral discharge apertures for exhaust products resulting from combustion of burnable gases interiorly of the burner. The burner is generally cylindrical in configuration with the lower end provided with a tapering rounded nose generally in the shape of a bullet to facilitate penetration of the plastic film when the burner is heated and also facilitate the formation of a cavity in the seed bed. To protect the discharge openings for the exhaust products against various adverse climate conditions and the like, a peripheral shield is provided for the discharge apertures for the combustion products with the shield being disposed in outwardly spaced relation and closed at the top but open at the bottom to enable the combustion products to move downwardly along the outer surface of the burner thereby enhancing the heating of the burner by the combustion products which not only engage the inner surface of the burner but also partially engage the outer surface thereof.

3 Claims, 5 Drawing Figures

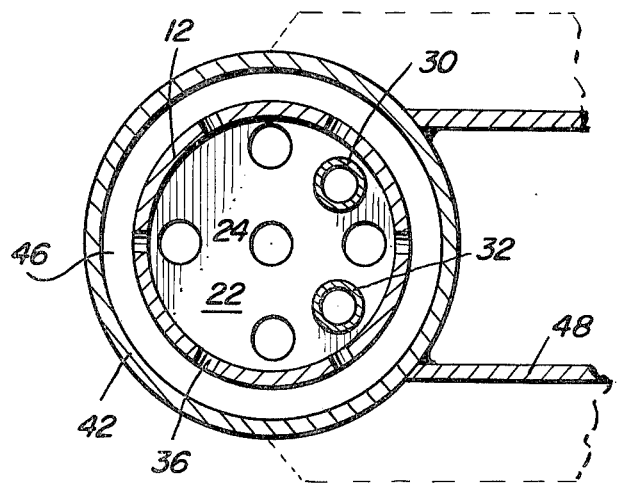
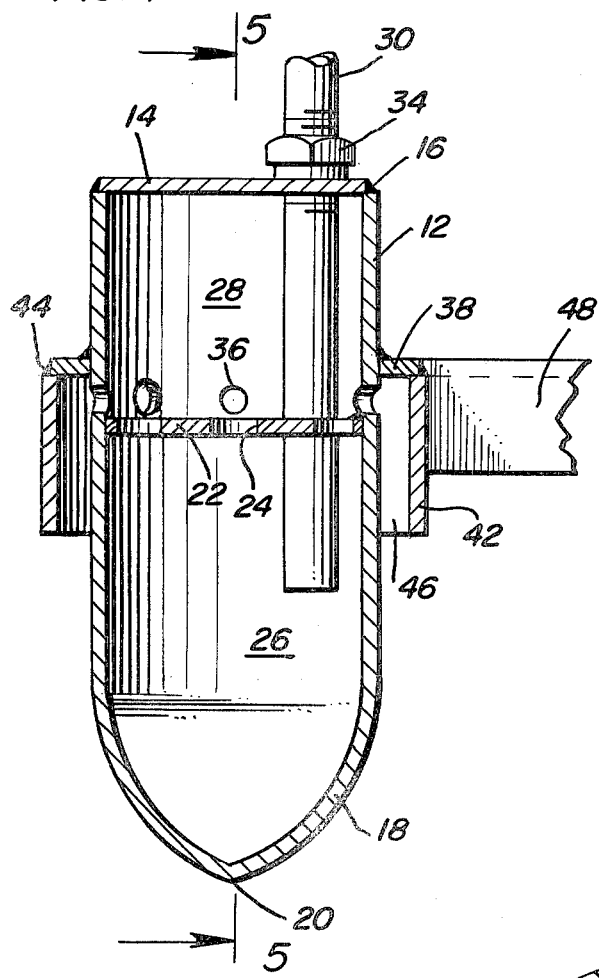
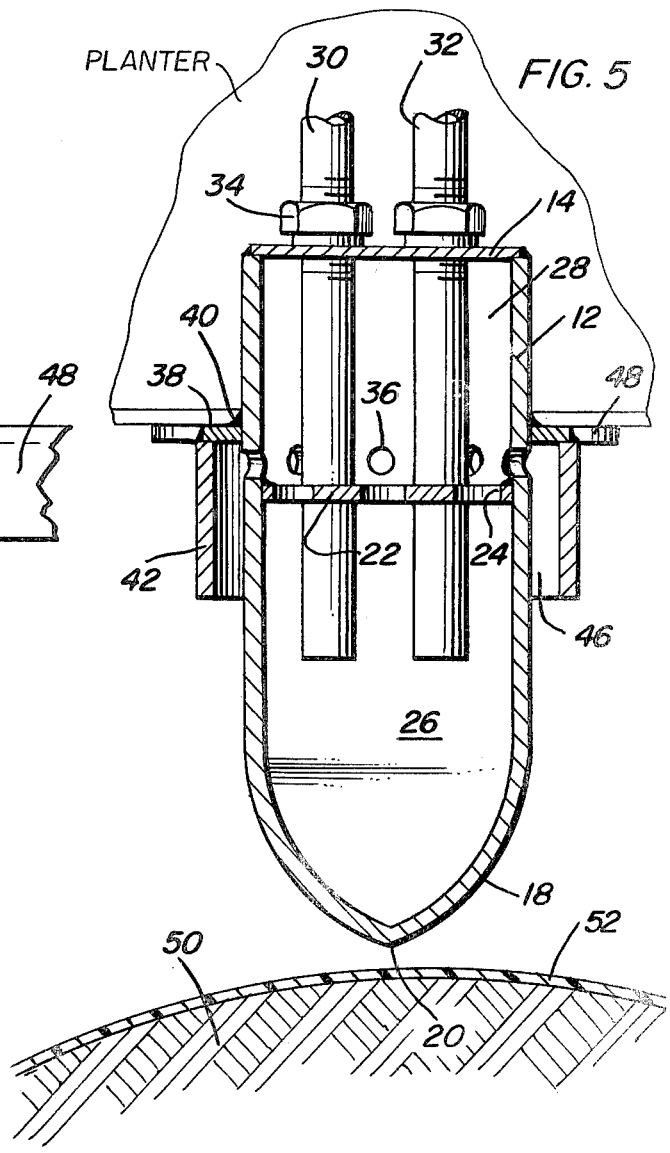

ALL WEATHER JET BURNER FOR PLANTERS

BACKGROUND OF THE INVENTION

1. Field of the Invention

The present invention generally relates to a jet burner for planters in which the burner is provided with a combustion chamber in the form of a tubular member having a closed, rounded lower end and provided with peripheral discharge apertures for combustion products with the apertures being enclosed by a downwardly opening shield to protect the burner from adverse climate conditions thereby enabling all-weather operation and also directing hot combustion products downwardly along the outer surface of the tubular member, thereby more efficiently heating the external surface of the tubular member to facilitate its insertion through a plastic film overlying an elevated seed bed so that seeds, pre-germinated seeds, seedlings, and the like, may be deposited into the seed bed.

2. Description of the Prior Art

There has recently been developed a system of planting in which the seeds are pre-germinated before placement in a seed bed, thus shortening the maturity time for the plants involved by several weeks. In this type of system, elevated seed beds are prepared and covered with a plastic film and the planter must puncture the plastic film in order to deposit the pre-germinated seeds into the seed bed. Various types of devices for puncturing a plastic film are known, but problems still exist in providing an efficient, dependable, long-lasting and effective apparatus for forming openings through the plastic film.

SUMMARY OF THE INVENTION

An object of the present invention is to provide a jet burner for attachment to and forming a part of a planter to provide a heated, generally bullet-shaped tubular member for insertion through and forming an opening through a plastic film to enable a pre-germinated seed assembly to be placed in a seed bed through the opening in the film.

The above object is obtained by the provision of a tubular hollow member having a rounded lower end to define a generally bullet-shape with combustible gases supplied to the interior of the tubular member which becomes a combustion chamber with a plurality of peripherally disposed exhaust opening providing passage of combustion products therefrom and enabling ignition of the combustible gases. A peripheral shield which opens downwardly is disposed around the exhaust openings in the tubular member to deflect the exhaust products downwardly and to protect the openings from adverse weather conditions, thereby rendering the device effective for use in all types of weather.

Another object of the invention is to provide a jet burner in accordance with the preceding object in which the shield is formed by a cylindrical member encircling the tubular member and joined thereto by a top annular plate which is secured to the periphery of the tubular member just above the exhaust openings with the shield extending below the exhaust openings in spaced concentric relation thereto thereby defining a downwardly opening annular discharge space for the exhaust products so that they will travel downwardly along the surface of the tubular member.

Still another object of the invention is so provide a jet burner in accordance with the preceding objects which is efficient in operation, easy to support from the planter, effective for its purposes and long-lasting and dependable in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse, plan sectional view taken substantially upon a plane passing along section line 3—3 of FIG. 2 illustrating the specific structural details of the burner.

FIG. 4 is a vertical sectional view taken substantially upon a plane passing along section line 4—4 of FIG. 1 illustrating further structural details of the burner.

FIG. 5 is a transverse, sectional view taken substantially upon a plane passing along section line 5—5 of FIG. 2 illustrating additional structural details of the burner and the relation of a seed bed and plastic film thereto.

DESCRIPTION OF THE PREFERRED EMBODIMENT

Figure 1:
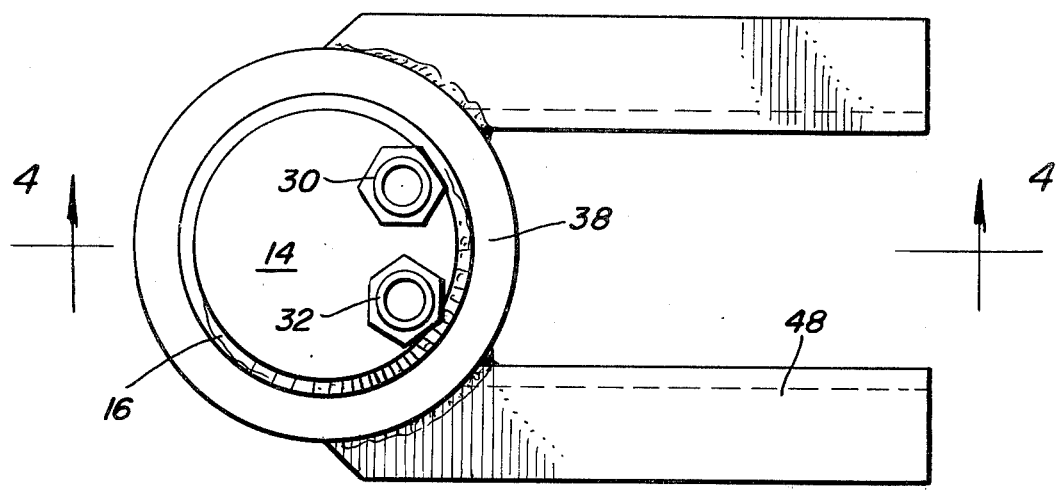
FIG. 1 is a top plan view of the jet burner of the present invention.
Figure 2:
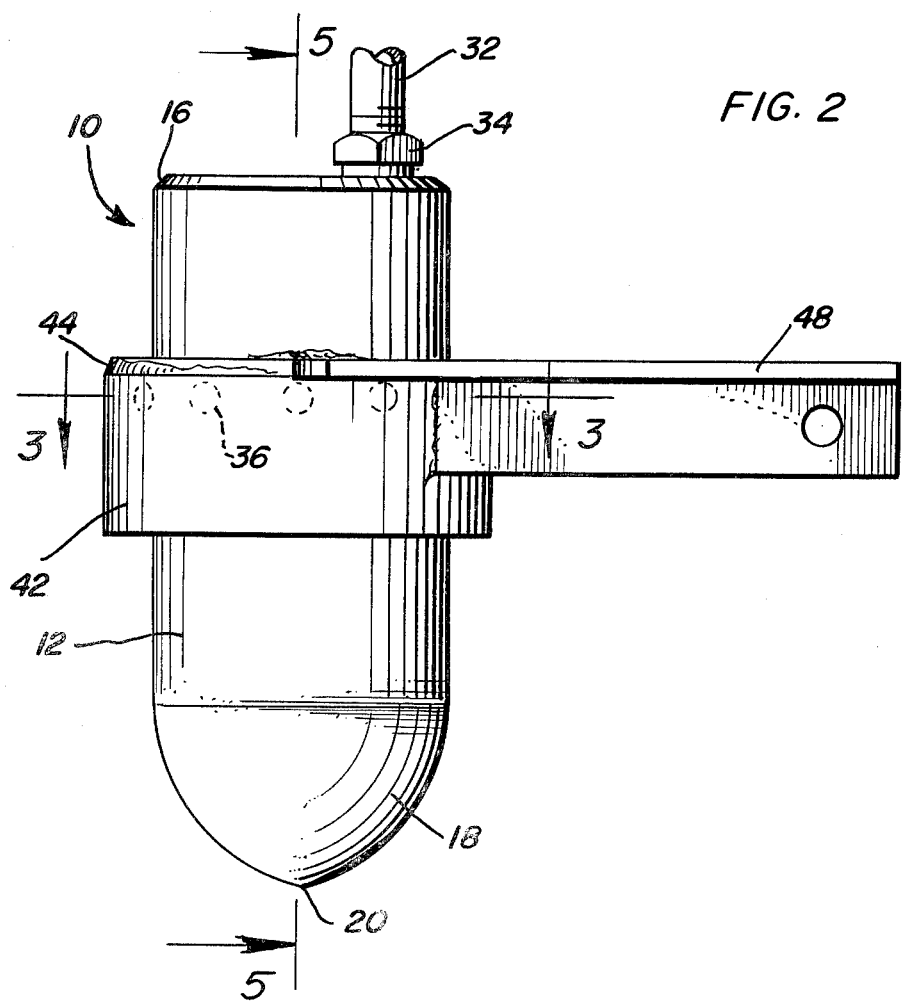
FIG. 2 is a side elevational view of the construction of FIG. 1.

Referring now specifically to the drawings, the jet burner of the present invention is generally designated by the numeral 10 and includes a vertically disposed cylindrical tubular member 12 of metallic construction and which includes a top closure plate 14 at the upper end thereof which is circular in configuration and forms a closure for and is rigidly secured to the tubular member 12 as by welding 16 or the like. The lower end of the vertical disposed and elongated tubular member 12 includes an inwardly curved portion 18 terminating in an apex 20 which is generally semi-oval in configuration or bullet-shaped so that the tubular member 12 may be defined as bullet-shaped with the inwardly curved end 18 defining a bullet-shaped nose.

The central portion of the tubular member 12 includes a transverse partition 22 having a central and four equally spaced circumferential openings 24 therein which communicates the lower compartment 26 with the upper compartment 28 of the interior of the tubular member with the partition 22 dividing the compartments and the openings 24 providing communication therebetween. A pair of gas supply pipes 30 and 32 extend down through the top plate 14 and through openings in the partition plate 22 and terminate in open lower ends within the compartment 26 with retaining couplings or nuts 34 securing the pipes 30 and 32 in position. One of the pipes 30 will supply propane and the other pipe will supply oxygen with the pipes being communicated with suitable sources of pressurized gas so that a combustible gas mixture will be discharged into the lower compartment 26 which becomes a combustion chamber for the combustible gases. Suitable control valves and the like (not shown) are provided to control the flow of gases through the pipes 30 and 32. As the combustible mixture burns in the combustion chamber 26, the products of combustion will pass through the apertures 24 into the upper compartment 28 and exit peripherally and radially therefrom through a series of exhaust openings 36 spaced circumferentially of the tubular member 12 immediately above the partition 22 as illustrated in FIGS. 4 and 5.

Attached to the exterior of the tubular member 12 is an annular plate 38 disposed just above the exhaust openings 36 and secured rigidly to the tubular member 12 as by welding 40 or the like. Attached to and depending from the peripheral portion of the plate 38 is a cylindrical shield 42 in the form of a cylindrical metal member connected to the plate 38 as by welding 44 or the like with the shield 42 being spaced radially from and concentric with the tubular member 12 thereby defining a downwardly opening annular space 46 between the shield plate 42 and the tubular member 12 as illustrated in FIGS. 4 and 5 so that combustion products passing through the apertures 36 will proceed downwardly in the annular space 46 along the outer surface of the tubular member 12 for ultimately discharge to the atmosphere.

A pair of apertured support members 48 are welded or otherwise secured to the plate 38 and tubular member 12 to provide a structure to facilitate mounting of the burner on a planter or other implement.

With a burner provided for each seed bed, such as seed bed 50, as illustrated in FIG. 5 which is in the form of an elevated seed bed or ridge, holes can be formed in the plastic film 52 which is disposed in overlying relation to the seed bed 50 by lowering the heated burner 10 so that the hot bullet-shaped lower end portion 18 will melt through the plastic film 52 to form an opening therein and also form a cavity in the seed bed 50 for subsequently depositing a "plug" with pre-germinated seed therein in which the "plug" includes soil and a gel having various additives which can be deposited into the seed bed through the opening in the plastic film. The orientation of the openings 36 and the association of the combustion chamber 26 and openings 24 as well as the annular space 46 provides for discharge of combustion products downwardly along the outer surface of the burner or tubular member 12 and the burner can also be easily ignited by positioning an igniting device such as a match or the like at the lower end of the space 46 after the gases of the lines 30 and 32 have been turned on thereby providing a simple yet long-lasting and effective burner in which the shield 42 protects the burner from various weather conditions.

The entire structure of the burner is constructed of readily available materials and standard welding techniques are utilized to secure the components in assembled relation with the threaded nuts 34 or coupling members used to detachably secure the burners in place with the members 34 being a standard coupling or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use in combination with a planter adapted to move longitudinally along an elevated seed bed having a plastic film overlying the same, a burner for forming holes through the plastic film when lowered into engagement therewith, said burner comprising a hollow cylindrical member having a closed upper end and a bullet-shaped lower end, pipe means supplying a combustible mixture into the interior of the hollow cylindrical member, exhaust openings in the hollow cylindrical member for discharge of combustion products with combustion of the combustible mixture heating the external surface of the lower end of said hollow cylindrical member for forming a hole in the plastic film when the heated bullet-shaped lower end of the hollow cylindrical member is lowered into engagement therewith, said hollow cylindrical member including a downwardly opening shield mounted exteriorly thereof in concentric spaced relation to the exhaust openings for directing exhaust products down around the lower end of the hollow cylindrical member for effectively heating the outer surface thereof as well as the inner surface with the round lower end of the hollow cylindrical member also forming a cavity in the seed bed when lowered into engagement therewith during movement of the planter along the seed bed.

2. The combination as defined in claim 1 wherein said hollow cylindrical member includes a transverse partition intermediate the ends thereof, said pipe means extending into the interior of the hollow cylindrical member below the partition with the exhaust openings being disposed above the partition, said partition having a plurality of apertures therein to communicate the combustion chamber with the exhaust openings, said shield including an upper end extending above the exhaust openings and connected to the hollow cylindrical member by an imperforate plate, the lower end of the shield extending below the exhaust openings for a substantial distance for directing combustion products downwardly toward the plastic film.

3. For use in combination with a planter adapted to move longitudinally along a seed bed having a plastic film overlying the same, a burner for forming holes through the plastic film when lowered into engagement therewith, said burner comprising a tubular member having a closed upper end and a bullet-shaped lower end, pipe means supplying a combustible mixture into the interior of the tubular member, lateral exhaust openings in the tubular member for discharge of combustion products with combustion of the combustible mixture heating the external surface of the lower end of said tubular member for forming a hole in the plastic film when the heated bullet-shaped lower end of the tubular member is lowered into engagement therewith, said tubular member including a downwardly opening shield fixedly mounted exteriorly thereof in concentric spaced relation to the exhaust openings for directing exhaust products down around the lower end of the tubular member for effectively heating the outer surface thereof as well as the inner surface with the round lower end of the tubular member also forming a cavity in the seed bed when lowered into engagement therewith during movement of the planter along the seed bed.

* * * * *